(12) United States Patent
Kirklin et al.

(10) Patent No.: US 8,962,203 B2
(45) Date of Patent: Feb. 24, 2015

(54) FUEL CELL SYSTEM AND METHOD OF OPERATING THE SYSTEM OUTSIDE OF DESIRED THERMAL OPERATING CONDITIONS

(75) Inventors: Matthew C. Kirklin, Pittsford, NY (US); Seth E. Lerner, Honeoye Falls, NY (US); David G. Trelly, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 389 days.

(21) Appl. No.: 11/972,325

(22) Filed: Jan. 10, 2008

(65) Prior Publication Data

US 2009/0181267 A1 Jul. 16, 2009

(51) Int. Cl.
*H01M 8/04* (2006.01)

(52) U.S. Cl.
CPC ...... *H01M 8/04126* (2013.01); *H01M 8/04007* (2013.01); *H01M 8/04335* (2013.01); *H01M 8/04373* (2013.01); *H01M 8/04776* (2013.01); *H01M 8/04947* (2013.01); *Y02E 60/50* (2013.01)
USPC .......................................... 429/434; 429/442

(58) Field of Classification Search
USPC .............................................. 429/13, 22, 24
See application file for complete search history.

(56) References Cited

U.S. PATENT DOCUMENTS

| | | | |
|---|---|---|---|
| 6,562,498 B1 * | 5/2003 | Walsh ........................... | 429/434 |
| 2002/0146606 A1 * | 10/2002 | Kobayashi et al. ............ | 429/24 |
| 2003/0022037 A1 * | 1/2003 | Parr et al. ....................... | 429/22 |
| 2003/0170517 A1 * | 9/2003 | Pechtold ........................ | 429/25 |
| 2004/0166389 A1 * | 8/2004 | Matsuoka et al. ............. | 429/26 |
| 2005/0048338 A1 * | 3/2005 | Kobayashi et al. ............ | 429/26 |
| 2006/0073363 A1 * | 4/2006 | Taniguchi et al. ............. | 429/12 |
| 2007/0073363 A1 | 3/2007 | DiMauro et al. | |
| 2007/0154756 A1 * | 7/2007 | Fujita et al. .................... | 429/23 |
| 2007/0287036 A1 * | 12/2007 | Kondo et al. ................... | 429/13 |

FOREIGN PATENT DOCUMENTS

JP 2002184435 A * 6/2002
WO WO 2005078842 A1 * 8/2005

* cited by examiner

*Primary Examiner* — Barbara Gilliam
*Assistant Examiner* — Stephen Essex
(74) *Attorney, Agent, or Firm* — Fraser Clemens Martin & Miller LLC; James D. Miller

(57) ABSTRACT

A fuel cell system is disclosed that employs a thermal sensor for measuring an amount of heat generated in the fuel cell system, wherein a sensor signal from the thermal sensor is used to adjust operation of the fuel cell system when the fuel cell system is operating outside of desired thermal operating conditions.

18 Claims, 1 Drawing Sheet

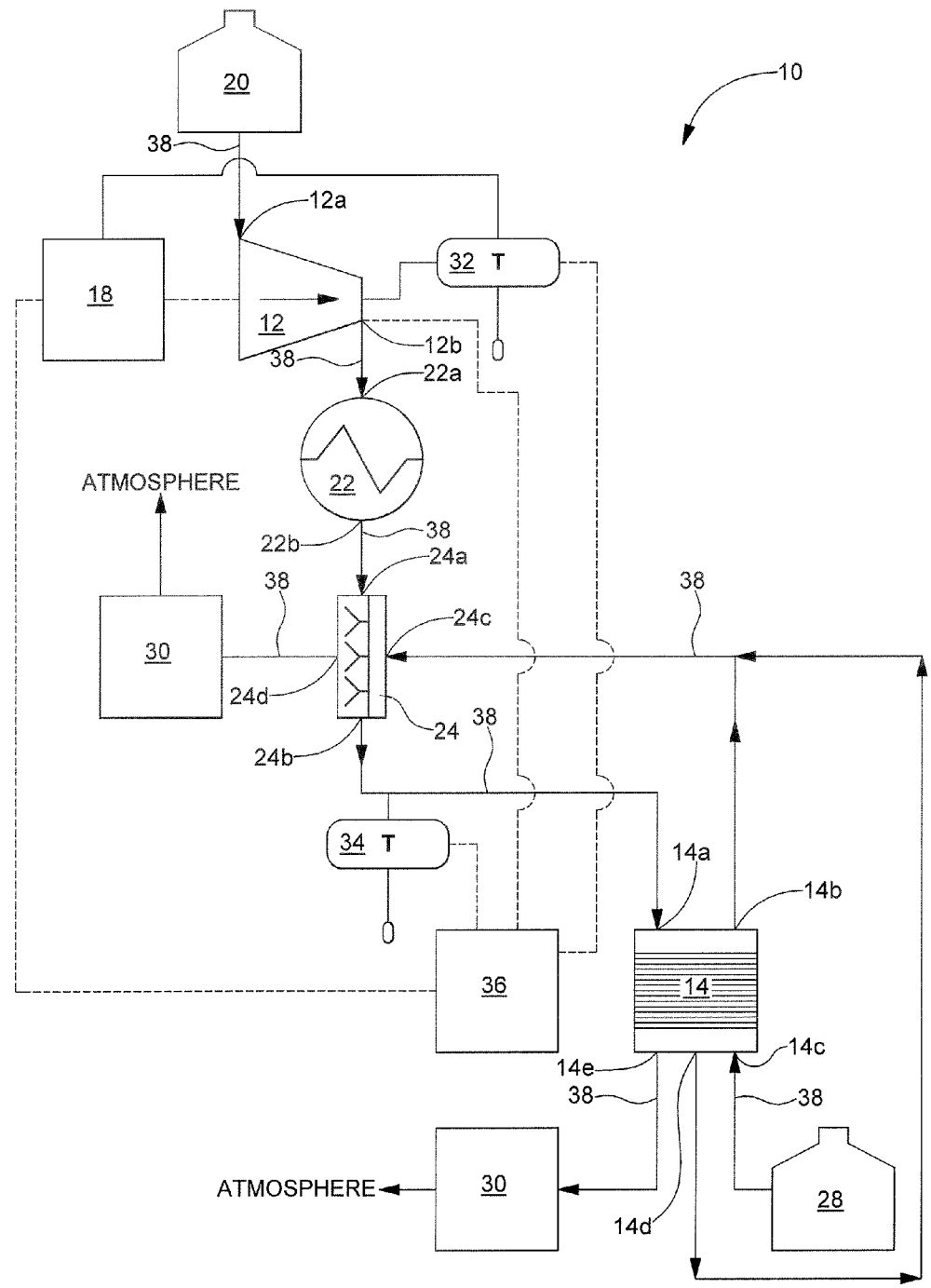

FUEL CELL SYSTEM AND METHOD OF OPERATING THE SYSTEM OUTSIDE OF DESIRED THERMAL OPERATING CONDITIONS

FIELD OF THE INVENTION

This invention relates to a fuel cell system and, more particularly, to a method of operating a fuel cell system outside of desired thermal operating conditions.

BACKGROUND OF THE INVENTION

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte disposed therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Many fuel cells are typically combined in a fuel cell stack to generate the desired power for the vehicle. The fuel cell stack receives a cathode input gas as a flow of air, typically forced through the stack by a compressor. Not all of the oxygen in the air is consumed by the stack, and some of the air is output as a cathode exhaust gas that may include water as a stack by-product.

The components of the fuel cell system in the vehicle, such as a compressor motor and a compressor motor power inverter module, generate heat during operation of the fuel cell system. The heat energy must be removed from the fuel cell system to keep the internal temperatures of the components and fuel cell system within desired operating conditions to militate against damage to the components. Heat energy is typically removed from the fuel cell system by a coolant caused to flow through the fuel cell system by a recirculation pump. If the recirculation pump fails or the coolant leaks from the fuel cell system, the fuel cell system may overheat, shutdown, and cause the components to perform below an optimal level. Further, if the fuel cell system is shutdown or damaged, an operator of the vehicle incorporating the fuel cell system may not be able to operate the vehicle, resulting in a walk home incident It would be desirable to provide a method for operating a fuel cell system when the fuel cell system is operating outside of desired thermal operating conditions.

SUMMARY OF THE INVENTION

Concordant and congruous with the present invention, a method for operating a fuel cell system when the fuel cell system is operating outside of desired thermal operating conditions, has surprisingly been discovered.

In one embodiment, the fuel cell system comprises a fuel cell stack including at least a cathode inlet and a cathode outlet, wherein a fluid is caused to flow through the cathode inlet and the cathode outlet of said fuel cell stack; a compressor in fluid communication with said fuel cell stack; a first thermal sensor in communication with said compressor, said first thermal sensor adapted to generate a sensor signal indicative of a temperature of said compressor; and a control system adapted to receive the sensor signal from said first thermal sensor and cause a change in operation of said compressor to minimize an amount of heat generated by said compressor.

In another embodiment, the fuel cell system comprises a fuel cell stack including at least a cathode inlet and a cathode outlet, wherein a fluid is caused to flow through the cathode inlet and the cathode outlet of said fuel cell stack; a compressor including a compressor power inverter and in fluid communication with said fuel cell stack; a first thermal sensor in communication with said compressor, said first thermal sensor adapted to generate a sensor signal indicative of a temperature of one of said compressor and the compressor power inverter; and a control system adapted to receive the sensor signal from said first thermal sensor and cause a change in operation of said compressor to minimize an amount of heat generated by said compressor.

In another embodiment, the method of operating a fuel cell system comprises the steps of: providing a fuel cell stack including at least a cathode inlet and a cathode outlet; providing a compressor in fluid communication with the fuel cell stack; providing a first thermal sensor in fluid communication with the compressor, the sensor adapted to generate a sensor signal indicative of a temperature of the compressor; providing a control system adapted to receive the sensor signal from the first thermal sensor; causing a fluid comprising oxygen to flow through the compressor of the fuel cell system, wherein the sensor signal is indicative of a temperature of the compressor; and adjusting the operation of the compressor with the control system based on the sensor signal to minimize an amount of heat generated by the compressor.

BRIEF DESCRIPTION OF THE DRAWINGS

The above, as well as other advantages of the present invention, will become readily apparent to those skilled in the art from the following detailed description of a preferred embodiment when considered in the light of the accompanying drawing in which a schematic flow diagram of a fuel cell system is shown according to an embodiment of the invention.

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The drawing shows a fuel cell system 10 according to an embodiment of the invention. The fuel cell system 10 includes a compressor 12 in fluid communication with a fuel cell stack 14.

In the embodiment shown, the compressor 12 is a centrifugal air compressor including a compressor motor power inverter 18. An inlet 12a of the compressor 12 is in fluid communication with an oxygen source 20 through a conduit 38. An outlet 12b of the compressor 12 is in fluid communication with an inlet 22a of a heat exchanger 22. The compressor 12 may be any conventional means for compressing a fluid such as a turbomachine, a centrifugal compressor, a mixed flow compressor, a blower or a fan, for example. The oxygen source 20 is typically a source of air. It is understood that the oxygen source 20 may be a fuel tank or the atmosphere, for example.

An outlet 22b of the heat exchanger 22 is in fluid communication with a first inlet 24a of a humidifier 24. In the embodiment shown, the heat exchanger 22 is a low-temperature core. It is understood that any conventional heat exchanger may be used such as a shell and tube heat exchanger, a plate heat exchanger, an air-cooled heat exchanger, or other heat exchanger known in the art.

The humidifier 24 is a water vapor transfer unit adapted to humidify an oxidant such as air prior to entering into the fuel cell stack 14. The water vapor transfer unit includes a dry side and a wet side separated by a water vapor permeable membrane (not shown) or the like. The dry side has the first inlet 24a and a first outlet 24b, and the wet side has a second inlet 24c and a second outlet 24d. The first outlet 24b is in fluid communication with a cathode inlet 14a of the fuel cell stack 14. The second inlet 24c is in fluid communication with a cathode outlet 14b of the fuel cell stack 14, and the second outlet 24d is in fluid communication with an exhaust system 30 that is in fluid communication with the atmosphere.

The fuel cell stack 14 includes a stack of cathodes, anodes, and membranes (fuel cells), as previously discussed herein. It is understood that the number of fuel cells in the fuel cell stack 14 may vary. Each fuel cell of the fuel cell stack 14 has a pair of MEAs (not shown) separated by an electrically conductive bipolar plate (not shown). The MEAs and bipolar plates are stacked together between clamping plates or end plates (not shown) and end contact elements (not shown). The end contact elements and bipolar plates contain a plurality of grooves or channels for distributing fuel and oxidant gases (i.e. hydrogen and oxygen) to the MEAs.

The fuel cell stack 14 further includes the cathode inlet 14a, the cathode outlet 14b, an anode inlet 14c, an anode outlet 14d, and an anode purge outlet 14e. The anode inlet 14c is in fluid communication with a hydrogen source 28. The anode outlet 14d is in fluid communication with the second inlet 24c of the humidifier 24. The anode purge outlet 14e is in fluid communication with another exhaust system 30 which is in fluid communication with the atmosphere. The number of inlets and outlets in the fuel cell stack 14 may vary based on the size of the stack in use, an amount of outlet energy required from the stack 14, and other design considerations. It is understood that the hydrogen source 28 may be a fuel tank or other system component, for example. It is also understood that the anode outlet 14b may be in fluid communication with the atmosphere, another fuel cell stack (not shown), or other system component, as desired.

In the embodiment shown, the fuel cell system 10 includes a first thermal sensor 32 in communication with the compressor 12 and the compressor motor power inverter 18. A second thermal sensor 34 is in communication with the first outlet 24b of the humidifier 24. The first thermal sensor 32 is adapted to provide a signal indicative of the temperature of the compressor 12 and the compressor motor power inverter 18. The second thermal sensor 34 is adapted to provide a signal indicative of the temperature of the fluid caused to flow from the humidifier 24 to the fuel cell stack 14. The first thermal sensor 32 and second thermal sensor 34 are in electrical communication with a control system 36. It is understood that the thermal sensors 32, 34 may be any conventional thermal sensor known in the art. It is also understood that the fuel cell system 10 may include additional thermal sensors in communication with the heat exchanger 22, a fuel cell system pump, the humidifier 24, and other system components, as desired.

In use, the air including oxygen is caused to flow from the oxygen source 20 and through the fuel cell system 10. The air is caused to flow through conduit 38 to the inlet 12a of the compressor 12. In the compressor 12, the volume of the air is reduced, thereby increasing the pressure and the temperature thereof. The air is then caused to flow through the conduit 38 to the inlet 22a of the heat exchanger 22. In the heat exchanger 22, the air is cooled to a desired temperature. The air from the outlet 22b of the heat exchanger 22 flows through the conduit 38 to the first inlet 24a of the humidifier 24 and through the dry side of the humidifier 24. In the humidifier 24, a fluid such as air having a higher moisture content than the air flowing through the dry side is caused to flow through the wet side. Moisture is transferred through the membrane to the air flowing through the dry side. The fluid in the wet side is caused to flow through the second outlet 24d of the humidifier 24, through the exhaust system 30, and to the atmosphere. The air in the dry side is caused to flow through the first outlet 24b to the cathode inlet 14a of the fuel cell stack 14.

Simultaneous to the air being caused to flow to the stack 14, hydrogen gas is caused to flow from the hydrogen source 28 to the anode inlet 14c of the fuel cell stack 14. In the fuel cell stack 14, the oxygen in the air electrochemically reacts with the hydrogen to generate power to drive a vehicle or other system as is known in the art. A portion of unreacted hydrogen may be caused to flow out of the fuel cell stack 14 through the anode outlet 14d, and through the conduit 38 to the second inlet 24c of the humidifier 24. Another portion of unreacted hydrogen may be caused to flow out of the fuel cell stack 14 through the anode purge outlet 14e, through the conduit 38, through the exhaust system 30, and to the atmosphere. Unreacted oxygen is caused to flow through the cathode outlet 14b, through the conduit 38, to the second inlet 24c of the humidifier 24.

While the fuel cell system 10 is in operation, the compressor 12 and the compressor motor power inverter 18 generate heat. If the temperature is outside a desired range due to the amount of heat generated, the first thermal sensor 32 sends a sensor signal to the control system 36. The control system 36 adjusts the operation of the compressor 12 and compressor motor power inverter 18. A maximum allowable compressor power based on the thermal sensor 32 signal is calculated by the control system 36. As the temperature in the fuel cell system 10 increases, the power generated by the compressor 12 and compressor motor power inverter 18 is minimized by the control system 36, thereby minimizing the heat generated by the compressor 12 and compressor motor power inverter 18. To minimize the power generated by the compressor 12 and the compressor motor power inverter 18, the rotational speed of the compressor 18 is minimized, thereby causing a reduction in the flow of fluid through the compressor 12. A reduction in the flow of fluid also minimizes the current produced by the fuel cell stack 14 and the power output of the fuel cell system 10. The power reduction of the compressor 12 and compressor motor power inverter 18 is typically gradual, continuous, and proportional to the temperature state of the fuel cell system 10. The fuel cell system 10 continues to operate at a minimized power output and reduced speed of the compressor 12, until the fuel cell system 10 is within the desired temperature range or until the fuel cell system 10 can be serviced.

Additionally, if a coolant flowing through the fuel cell system 10 leaks or if a coolant recirculation pump ceases operation, system components would generate heat and introduce the heat into the fuel cell system 10. If the temperature is outside a desired range due to the amount of heat generated, the first thermal sensor 32 sends a sensor signal to the control system 36. The control system 36 adjusts the operation of the compressor 12 and compressor motor power inverter 18. A maximum allowable compressor power based on the temperature sensor 32 signal is calculated by the control system 36. As the temperature in the fuel cell system 10 increases, the power generated by the compressor 12 and compressor motor power inverter 18 is minimized by the control system 36, thereby minimizing the heat generated by the compressor 12 and compressor motor power inverter 18. To minimize the power generated by the compressor 12 and the compressor motor power inverter 18, the rotational speed of the compressor 18 is minimize, thereby causing a reduction in the flow of fluid through the compressor 12. A reduction in the flow of fluid also minimizes the current produced by the fuel cell stack 14 and the power output of the fuel cell system 10. The power reduction of the compressor 12 and compressor motor power inverter 18 is typically gradual, continuous, and proportional to the temperature state of the fuel cell system 10. The fuel cell system 10 continues to operate at a minimized power output and reduced speed of the compressor 12 until the fuel cell system 10 is within the desired temperature range or until the fuel cell system 10 can be serviced. It is understood that the control system 36 may also adjust the operation of the heat exchanger 22, the humidifier 24, or other system component to minimize the heat generated and introduced to the fuel cell system 10, as desired.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack including a cathode inlet, a cathode outlet, an anode inlet, and an anode outlet, wherein a first fluid is caused to flow through the cathode inlet and the cathode outlet and a second fluid is caused to flow through the anode inlet and the anode outlet;
    a compressor in fluid communication with said fuel cell stack;
    a heat exchanger having an inlet and an outlet, the inlet in fluid communication with an outlet of the compressor;
    a humidifier adapted to humidify the first fluid having a first inlet in fluid communication with the outlet of said heat exchanger, an outlet in fluid communication with the cathode inlet of said fuel cell stack, and a second inlet in communication with a conduit including the cathode outlet and the anode outlet of said fuel cell stack for transferring moisture to the first fluid from the cathode outlet and the anode outlet, wherein said humidifier is a water vapor transfer unit including a dry side and a wet side separated by a water vapor permeable membrane, the water vapor permeable membrane simultaneously contacting the dry side and the wet side and configured to pass water vapor therethrough from the wet side to the dry side, the dry side in fluid communication with the first inlet and the outlet and the wet side in fluid communication with the second inlet;
    a first thermal sensor in communication with said compressor, said first thermal sensor adapted to generate a sensor signal indicative of a temperature of said compressor;
    a second thermal sensor in communication with the cathode inlet of said fuel cell stack, said second thermal sensor adapted to generate a sensor signal; and
    a control system adapted to receive the sensor signal from said first thermal sensor and said second thermal sensor to cause a change in operation of said compressor to minimize an amount of heat generated by said compressor, wherein said control system is configured to adjust operation of one of said heat exchanger and said humidifier to minimize heat introduced to the fuel cell system;
    wherein the fuel cell system is configured to operate at a minimized power output and a reduced speed of said compressor when a coolant flowing through the fuel cell system leaks or a coolant recirculation pump ceases operation.

2. The fuel cell system of claim 1, wherein said compressor includes a compressor motor power inverter in communication with said first thermal sensor.

3. The fuel cell system of claim 1, wherein the sensor signal of said second thermal sensor is indicative of a temperature of the first fluid at the cathode inlet.

4. The fuel cell system of claim 3, wherein said control system is adapted to receive the sensor signal from said second thermal sensor to cause a change in the operation of said compressor to minimize the amount of heat generated by said humidifier.

5. The fuel cell system of claim 1, wherein said fuel cell stack includes an anode purge outlet.

6. The fuel cell system of claim 5, further comprising an exhaust system in fluid communication with the anode purge outlet of said fuel cell stack.

7. The fuel cell system of claim 1, wherein the control system is adapted to adjust said compressor when a temperature of the first thermal sensor is outside a desired range.

8. The fuel cell system of claim 1, wherein said control system is adapted to calculate a maximum allowable compressor power based on the sensor signal from said first thermal sensor.

9. The fuel cell system of claim 1, wherein the change in operation of the compressor is proportional to a temperature of the first thermal sensor.

10. The fuel cell system of claim 1, wherein the fuel cell system is configured to operate at a minimized power output and a reduced speed of said compressor until a temperature of the fuel cell system is within a desired range.

11. The fuel cell system of claim 1, wherein said heat exchanger is a low-temperature core.

12. A fuel cell system comprising:
    a fuel cell stack including a cathode inlet, a cathode outlet, an anode inlet, and an anode outlet, wherein a first fluid is caused to flow through the cathode inlet and the cathode outlet and a second fluid is caused to flow through the anode inlet and the anode outlet;
    a compressor including a compressor power inverter, said compressor in fluid communication with said fuel cell stack;
    a heat exchanger having an inlet and an outlet, the inlet in fluid communication with an outlet of the compressor;
    a humidifier adapted to humidify the first fluid having a first inlet in fluid communication with the outlet of said heat exchanger, an outlet in fluid communication with the cathode inlet of said fuel cell stack, and a second inlet in communication with a conduit including the cathode outlet and the anode outlet of said fuel cell stack for transferring moisture to the first fluid from the cathode outlet and the anode outlet;

a first thermal sensor in communication with said compressor, said first thermal sensor adapted to generate a sensor signal indicative of a temperature of one of said compressor and the compressor power inverter;

a second thermal sensor in communication with the cathode inlet of said fuel cell stack, said second thermal sensor adapted to generate a sensor signal indicative of a temperature of the first fluid at the cathode inlet; and a control system adapted to receive the sensor signal from said first thermal sensor and said second thermal sensor to cause a change in operation of at least one of said compressor and said compressor power inverter to minimize an amount of heat generated thereby, wherein said control system is configured to adjust operation of one of said heat exchanger and said humidifier to minimize heat introduced to the fuel cell system;

wherein the fuel cell system is configured to operate at a minimized power output and a reduced speed of said compressor when a coolant flowing through the fuel cell system leaks or a coolant recirculation pump ceases operation.

13. The fuel cell system of claim 12, wherein said control system is adapted to respond to the sensor signal from said second thermal sensor to cause a change in the operation of said compressor to minimize the heat generated by said humidifier.

14. The fuel cell system of claim 12, wherein said fuel cell stack includes an anode purge outlet.

15. The fuel cell system of claim 14, further comprising an exhaust system in fluid communication with the anode purge outlet of said fuel cell stack.

16. A fuel cell system comprising:
 a fuel cell stack including a cathode inlet, a cathode outlet, an anode inlet, and an anode outlet, wherein a first fluid is caused to flow through the cathode inlet and the cathode outlet and a second fluid is caused to flow through the anode inlet and the anode outlet;
 a compressor including a compressor power inverter, said compressor in fluid communication with said fuel cell stack;
 a heat exchanger having an inlet and an outlet, the inlet in fluid communication with an outlet of the compressor;
 a humidifier adapted to humidify the first fluid having a first inlet in fluid communication with the outlet of said heat exchanger, an outlet in fluid communication with the cathode inlet of said fuel cell stack, and a second inlet in communication with a conduit including the cathode outlet and the anode outlet of said fuel cell stack for transferring moisture to the first fluid from the cathode outlet and the anode outlet;
 a first thermal sensor in communication with said compressor, said first thermal sensor adapted to generate a sensor signal indicative of a temperature of one of said compressor and the compressor power inverter;
 a second thermal sensor in communication with the cathode inlet of said fuel cell stack, said second thermal sensor adapted to generate a sensor signal indicative of a temperature of the first fluid at the cathode inlet; and
 a control system adapted to receive the sensor signal from said first thermal sensor and said second thermal sensor to cause a change in operation of at least one of said compressor, said compressor power inverter, and said humidifier to minimize an amount of heat generated thereby, wherein said control system is configured to adjust operation of one of said heat exchanger and said humidifier to minimize heat introduced to the fuel cell system;
 wherein the fuel cell system is configured to operate at a minimized power output and a reduced speed of said compressor when a coolant flowing through the fuel cell system leaks or a coolant recirculation pump ceases operation.

17. The fuel cell system of claim 16, wherein said fuel cell stack includes an anode purge outlet.

18. The fuel cell system of claim 17, further comprising an exhaust system in fluid communication with the anode purge outlet of said fuel cell stack.

* * * * *